E. Oliver,
Cage Trap,
Nº 2,828. Patented Oct. 22, 1842.
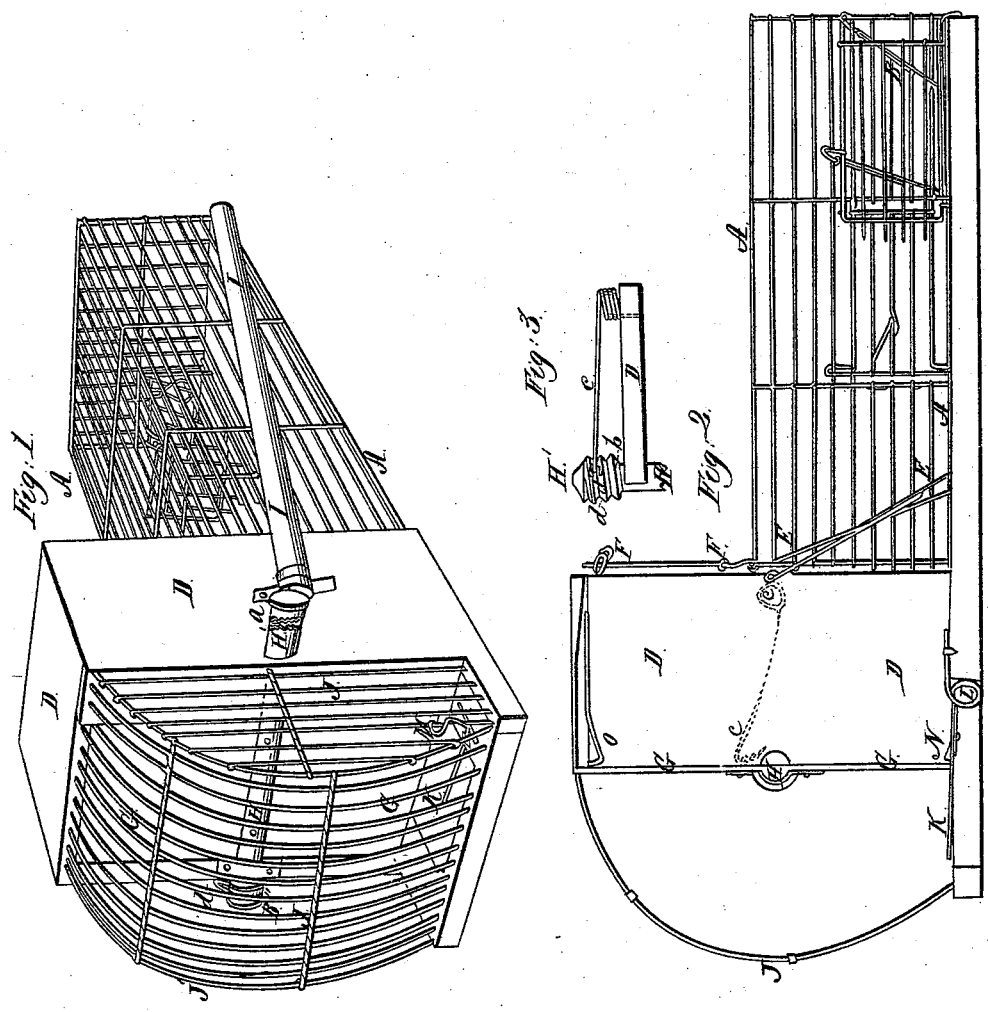

UNITED STATES PATENT OFFICE.

EBENEZER OLIVER, OF PHILADELPHIA, PENNSYLVANIA.

RAT-TRAP.

Specification of Letters Patent No. 2,828, dated October 22, 1842.

*To all whom it may concern:*

Be it known that I, EBENEZER OLIVER, of the city of Philadelphia, in the State of Pennsylvania, have invented a new and useful Improvement in the Manner of Constructing Traps for the Catching of Rats, Mice, and other Animals; and I do hereby declare that the following is a full and exact description thereof.

In the accompanying drawing, Figure 1, is a perspective representation of the trap, and Fig. 2, a longitudinal, vertical section of it through its middle.

A, A, is a wire cage, which has an entrance into it that is closed by drop doors, B, and C, constructed so as to be lifted by the entering of the animals, in the ordinary manner. There are two such doors, so placed in order to prevent the escape of one animal while another is passing in. This device is well known, and does not constitute any part of my invention; which invention I will now describe.

D, D, is a box that may be made of wood, and which opens into the cage, A, A, but is furnished with a drop door E, E, operating like the doors B, and C. The upper end of the box D, at the part F, F, may be inclosed by a door of wood, or of wire grating.

G, G, is a revolving door, which may be made of sheet metal, and is so hung as to turn with an axis H, H', to which it is attached at its center.

I, I, is a tube that forms a case to a spiral, or other, spring, to which spring is attached a chain, or cord, *a;* and by turning the door G, upon its axis, the chain, or cord, *a* will be made to wind around the end, H', of the axis H; and if the door G, be left at liberty, the above named spring will cause it to revolve. The outer end of the box D, to which the door G, is hung, is, in part, inclosed, or surrounded, by wire-work, J, J, the end toward J', being left open.

K, is a platform door, supported on springs L; and M, is a hook to which the bait is to be fastened; in approaching this, the animal must tread upon the platform K, which will depress it, and with it a stop piece N, attached to it, so as to liberate the revolving door G; and this, being acted on by the spiral spring, will make a rapid semi-revolution, and striking against the animal will force it against the drop door E, and into the cage A; the door G, after making its semi-revolution, will be again arrested by the stop piece N. A wire check spring O, is made to bear upon the upper end of the revolving door, and aids in keeping it steady. When an animal has been thus caught, the trap still remains set, and will so remain for any desired number of semi-revolutions of the door G, say four, five, or more.

It is necessary to keep the spiral spring in a state of continued tension, so that when the door G, is making its last semi-revolution, it shall do so with great rapidity and force; and for this purpose, I adapt a catch to the end H'', of the shaft H, in the following manner. I cut a screw on the end of the shaft, as shown at *b*, in Fig. 3, and cause a wire spring *c*, having a hook at its end, to bear upon the screw between its threads, and when the trap is fully set, the end of this wire spring will be close to the side D, of the box, and when it has made as many semi-revolutions as are desired, the hook on *c*, will catch into a staple *d*, which straddles the outer thread of the screw, and will, consequently, prevent the further revolving of the door G. The wire spring, *c*, is shown in dotted lines in Fig. 2.

Having thus, fully described the manner in which I construct my improved trap for catching rats, mice, and other animals, what I claim therein as new, and desire to secure by Letters Patent, is—

The forcing of the rat, or other animal, into the compartment within which it is to be detained, by means of a revolving door, operated upon by a spiral, or other, spring; the said door and spring being so combined with a platform, and other appendages, as that they shall coöperate in effecting the intended purpose, by an arrangement of parts substantially the same with that herein set forth.

EBENEZER OLIVER.

Witnesses:
 THOS. P. JONES,
 E. L. BRUNDAGE.